United States Patent
Snyder et al.

(10) Patent No.: US 9,491,274 B1
(45) Date of Patent: Nov. 8, 2016

(54) MAGNETICALLY ALIGNING HANDSET AND CORD

(71) Applicant: Cisco Technology, Inc., San Jose, CA (US)

(72) Inventors: Ian M. Snyder, San Francisco, CA (US); Matthew Cho, San Francisco, CA (US); Morgan Teachworth, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/992,717

(22) Filed: Jan. 11, 2016

(51) Int. Cl.
*H04M 1/00* (2006.01)
*H04M 1/15* (2006.01)

(52) U.S. Cl.
CPC ..................... *H04M 1/15* (2013.01)

(58) Field of Classification Search
CPC .......... H04M 1/15; H04M 1/02; H04M 1/03; H04M 2201/161; H04M 1/0293
USPC .................................. 379/436–438
See application file for complete search history.

(56) References Cited

U.S. PATENT DOCUMENTS

| | | | | |
|---|---|---|---|---|
| 5,303,292 A | * | 4/1994 | Takahashi | H04M 1/0297 379/433.13 |
| 5,710,812 A | * | 1/1998 | Fogel | H04M 1/15 379/438 |
| 5,729,606 A | * | 3/1998 | Linderholm | H04M 1/15 379/437 |

* cited by examiner

*Primary Examiner* — Tuan D Nguyen
(74) *Attorney, Agent, or Firm* — Polsinelli PC (57) ABSTRACT

In one embodiment, a system may include a telephone casing comprising a magnet and a backside. The system can also include a telephone cord and a telephone cord retainer comprising magnetic material. The telephone cord retainer can retain the telephone cord. Magnetic force may retain the telephone cord retainer to the telephone casing.

16 Claims, 7 Drawing Sheets

MAGNETICALLY ALIGNING HANDSET AND CORD

TECHNICAL FIELD

The present technology pertains to telephone hardware, and more specifically to telephone cord and handset retention.

BACKGROUND

The design of a telephone with respect to cords/cables that it utilizes has generally been unchanged for some time. While cables may be required for functionality of a telephone, the storing/placement of the cables with respect to other telephone hardware can be cumbersome, difficult, and sometimes detrimental to convenient positioning of telephone cords and proper positioning of the telephone handset device. Additionally, traditional telephone designs may utilize cord trenches with seating tabs to seat telephone cables. These trenches can be difficult to insert telephone cords into and sometimes result in damage to the telephone cords and/or telephone casing when being inserted into the cord trenches due to the awkward design of the cord trenches. Moreover, traditional telephone designs sometimes result in "handset lift," wherein a telephone handset is not properly seated in a handset cradle due to, for example, a handset cord folding over itself on a table where the telephone rests.

BRIEF DESCRIPTION OF THE DRAWINGS

In order to describe the manner in which the above-recited features and other advantages of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting its scope, the principles herein are described and explained with additional specificity and detail through the use of the accompanying drawings in which.

A component or a feature that is common to more than one drawing is indicated with the same reference number in each of the drawings.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

In some embodiments, a system may include a telephone casing comprising a magnet and a backside. The system can also include a telephone cord and a telephone cord retainer comprising magnetic material. The telephone cord retainer can retain the telephone cord. Magnetic force may retain the telephone cord retainer to the telephone casing. These and other features are disclosed in greater detail below.

DESCRIPTION

Some embodiments of the present technology can reduce or eliminate the need for a traditional telephone cord trench. A telephone cord/cable trench may be an opening or pathway of a telephone that can provide a seating position for a telephone cord to be stowed away from sight behind, around, or within a telephone device. Some telephone cord trenches may utilize fitting tabs to assist with alignment of the telephone cord within a telephone cord trench. Traditional fitting tabs may cause damage to a cord when the cord is inserted into the trench. A user may, for example, scratch or bend a cord in attempting to seat the cord into the trench. This may be caused by awkward alignment of the fitting tabs with respect to the telephone cord or the oftentimes small fitting space associated with the trench fitting tabs. Moreover, the fitting tabs of the telephone cord trenches sometimes break easily due to awkward positioning of a telephone cord inside the trench.

In some embodiments of the present technology, telephone cord trench fitting tabs or other physical positioning pieces may not be needed to hold a telephone cord to a telephone device. One or more magnets may be attached to the telephone device and/or the telephone cord in order to hold the telephone cord in a generally stationary position to the telephone device. This can provide an improvement over current technology which oftentimes allows a telephone cord to inadvertently disconnect from a telephone device or allows the telephone cord to tangle, sometimes leading to inadvertent telephone handset unseating/dislodgement from the handset cradle. In other embodiments, telephone cord trench fitting tabs can be used in conjunction with one or more magnets attached to the telephone casing and/or telephone cord.

In some embodiments, a telephone cord trench may not be utilized to hold the telephone cord in place on the telephone device. One or more magnetic objects may provide the support to keep the telephone cord in place on the telephone device. For example, one or more clips/telephone cord retainers can be attached to the telephone cord. The telephone cord retainers can be permanently fixed or removable. The telephone cord retainers can be made of a magnetic material, plastic, metal, or other material appropriate for telephone design. An example of a magnetic material may be a ferrous metal, but other types of magnetic material may be used. In addition, the telephone cord retainers may be located on the back, front, top, bottom, or sides of the telephone device. Each telephone cord retainer can be seated in a recessed portion/divot of the telephone device or each telephone cord retainer can be attached to the telephone without a recessed portion/divot for seating. Magnetic force may be the sole connecting feature of the telephone cord retainers to the telephone device. Magnetic force can also attract and automatically align the clips/telephone cord retainers into the divot. In other embodiments, magnetic force and other physical attaching components such as adhesive, tabs, slots, protruding pieces for positional security, and the like may be used in conjunction to keep a telephone cord connected to the telephone device.

In some embodiments, a telephone cord may be routed through an opening (e.g., a circular opening, "u-shaped" opening, etc.) of the telephone cord retainer. Some embodiments can utilize one or more magnets attached to the telephone cord retainers and/or the telephone casing itself (back, front, top, bottom, and/or sides of the telephone casing) to route and/or retain the telephone cord. In some embodiments, a single clip may be used in conjunction with a single magnet attached to the telephone casing in order to route and retain the telephone cord by utilizing magnetic force created between the magnet and the magnetic material of the telephone cord retainer/clip. In other embodiments, a different amount of magnets and magnetic materials may be used to achieve the effect of routing and retaining the telephone cord through the use of at least magnetic force.

In some embodiments the telephone cord retainer/clip may define a hole or c-shaped pass-through component for the telephone cord to be retained in. The clip may be permanently affixed to the cord such that the clip cannot move along the cord if pulled. The clip may be coated/ encapsulated in plastic, rubber, metal, and/or other appropriate material for facilitating connection via magnetic force. One or more magnets may be attached to the telephone device. The one or more magnets may be located inside the body/casing of the telephone device and/or on the back, front, bottom, top, or sides of the telephone device. The one or more magnets may also be mounted/affixed to the inside of a telephone back cover/wall mount by adding an internal shelf to the telephone device using ribs. Localized thinning can be utilized on the telephone back cover/wall mount to reduce distance between the one or more magnets and the clip, thereby increasing magnetic force. Magnetic force can hold the clip to the telephone casing which in turn may keep the telephone cord held to the telephone casing by virtue of the telephone cord being attached to the clip.

In some embodiments, a telephone cord trench may be comprised of magnetic material that provides for automatic alignment and retention of the telephone cable to the telephone device without use of a clip. For example, the telephone cord may be coated/encapsulated with magnetic material to allow the telephone cord to securely rest in the magnetic telephone cord trench. This would allow for greater ease in routing and securing the telephone cord to the telephone device without the need for a traditional cable trench that utilizes tabs for securing the telephone cord to the telephone device. This can prevent damage to the telephone cord that may result during improper installation to the telephone device.

Some embodiments of the present technology may also improve telephone handset retention in a telephone handset cradle. "Handset lift" can describe a scenario wherein a telephone handset is not properly seated in a handset cradle due to, for example, a handset cable folding over itself on a table or other surface where the telephone rests. This commonly occurs at the base of the handset where a telephone cord may come into contact with a hard surface and cause the base of the handset to improperly seat with the telephone handset cradle. Handset lift may also result from improper seating of the handset due to user misalignment of the handset with the handset cradle, for example, when a user slams the handset onto the cradle in an attempt to quickly hang up a telephone call. In some embodiments, one or more magnets may be utilized with a handset and/or handset cradle to assist in seating and/or retaining the handset to the handset cradle.

In some embodiments, one or more magnets may be placed inside a mouthpiece area of a telephone handset. Magnetic material such as ferrous metal or other magnetic material can be attached/combined with/positioned inside the microphone area (e.g., lower portion of the handset) or speaker area (e.g., upper portion of the handset) of the handset such that the one or more magnets attract and automatically align the handset mouthpiece (and therefore the entire handset) with the handset cradle, thereby eliminating or reducing the "handset lift" effect. In other embodiments, one or more magnets may be placed in/combined with the telephone handset and the handset cradle can be comprised of magnetic material in order to produce a similar result of automatically aligning the handset with the cradle through use of at least magnetic force.

Figure 1:
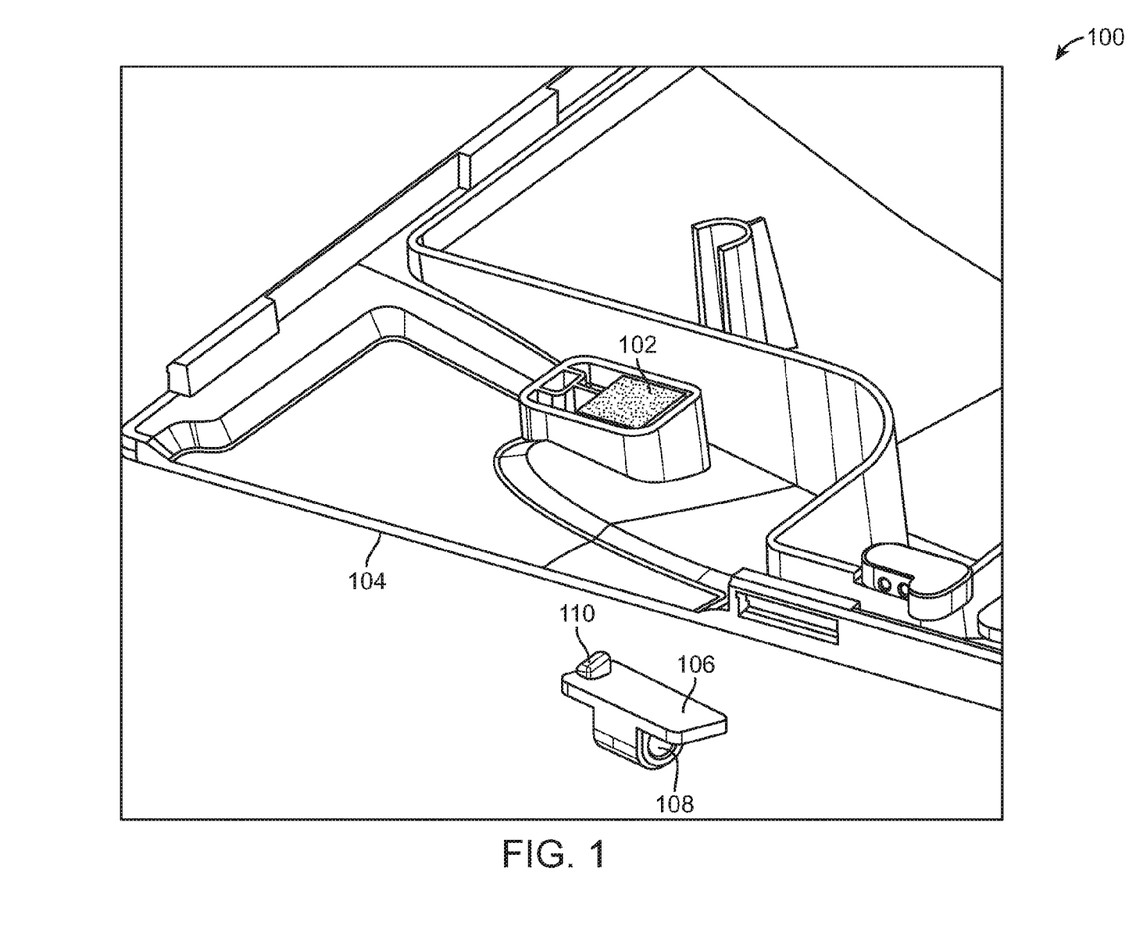
FIG. 1 illustrates an example telephone system showing embodiments of the present technology.

FIG. 1 illustrates an example telephone system 100 showing embodiments of the present technology. FIG. 1 shows an example telephone casing 104. Telephone casing 104 may include an upper portion and a lower portion. FIG. 1 illustrates a bottom view of the interior of the upper portion of telephone casing 104 when the lower portion or backside of the telephone casing 104 is removed. Magnet 102 may be representative of one or more magnets that may be utilized by some embodiments. Magnet 102 may be placed inside a telephone casing 104 or at any other appropriate location to provide magnetic force to components of the telephone system 100 such as, for example, telephone cord retainer 106. Telephone cord retainer 106 may define an opening 108 which may be a hole, circular opening, U-shaped opening, channel, and the like. The opening 108 can be used to retain a telephone cord to the telephone cord retainer 106. Telephone cord retainer 106 may comprise magnetic material such as, for example, ferrous metal. The telephone cord retainer 106 may then be reversibly affixed to the telephone casing 104 by magnetic force between magnet 102 and telephone cord retainer 106.

Figure 3:
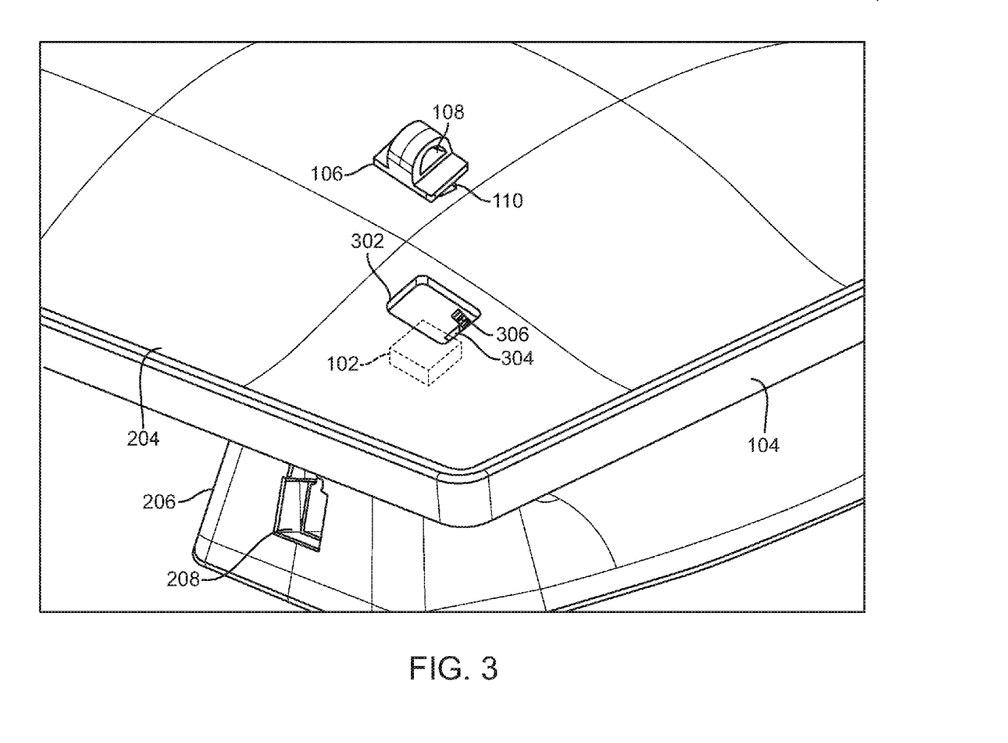
FIG. 3 illustrates an example telephone system showing embodiments of the present technology.

Tab 110 may be utilized for enhanced retention of the telephone cord retainer 106 to telephone casing 104. This can be accomplished by seating tab 110 into a recessed portion/divot such as, for example, divot 302 of FIG. 3 with opening 304. FIG. 3 illustrates a bottom view of the exterior of the lower portion or backside of telephone system 100. In some embodiments, seating tab 110 may be a male component being received and seated within female component, opening 304. Seating tab 110 can extend from telephone cord retainer 106 to be received and snuggly fit into opening 304. Divot 302 may enhance seating of the telephone cord retainer 106 to telephone casing 104 by defining a space for telephone cord retainer 106 to be seated and its edges to be surrounded so that telephone cord retainer 106 is more difficult to be detached from telephone casing 104. Opening 304 can enhance retention of the telephone cord retainer 106 to telephone casing 104 by defining a space for tab 110 to be surrounded in order to make detachment of telephone cord retainer 106 from telephone casing 104 more difficult. This may be useful for situations in which a user may inadvertently pull on the telephone cord such that pressure is exerted on telephone cord retainer 106. The divot 302 and/or opening 304 can make it more difficult for an inadvertent pull of a telephone cord to cause detachment of telephone cord retainer 106 from telephone casing 104.

Figure 2:
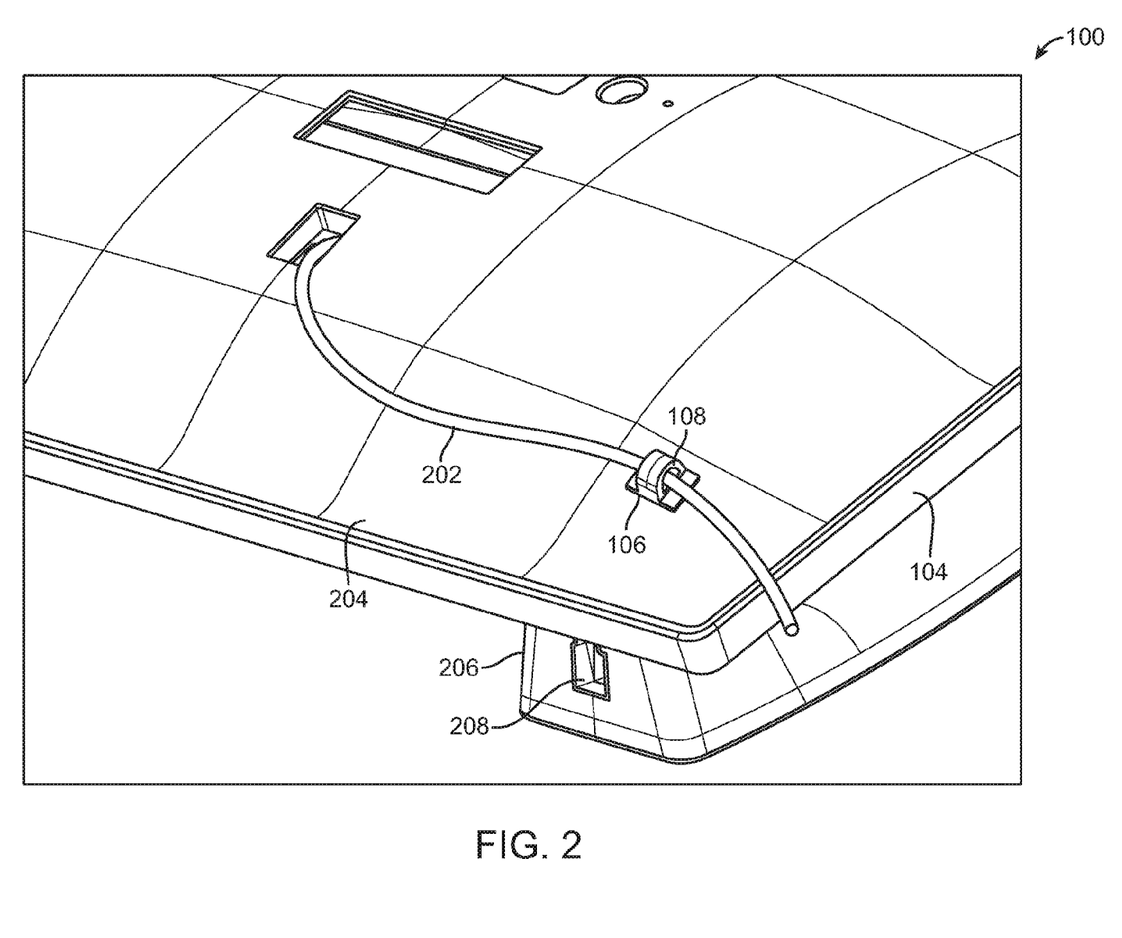
FIG. 2 illustrates an example telephone system showing embodiments of the present technology.

FIG. 2 illustrates example telephone system 100 showing embodiments of the present technology. Telephone system 100 of FIG. 2 shows telephone casing 104 with a backside 204 installed. FIG. 2 also shows telephone handset 206 with telephone cord jack receptacle 208. Telephone cord retainer 106 is shown on backside 204, but telephone cord retainer 106 may be attached to any section (top, bottom, front, sides, edges, etc.) of telephone system 100, and a telephone cord 202 may be routed through opening 108 to retain the telephone cord to the telephone cord retainer 106. Magnetic force between magnet 102 and the magnetic material of telephone cord retainer 108 may then be utilized to hold telephone cord retainer 106 and also telephone cord 202 to telephone casing 104. For example, magnet 102 may be positioned inside telephone casing 104 and in between telephone cord retainer 108 and handset 206. This can improve telephone cord management by removing the need for a telephone cord trench on the backside 204 of the telephone casing 104.

Telephone cord retainer 106 may or may not utilize a divot such as divot 302 of FIG. 3. With or without divot 302, at least a portion of telephone cord 202 may rest flush with the backside 204 of telephone casing 104. This can improve telephone cord management by keeping telephone cord 202 closely positioned or attached to telephone casing 104 and thereby away from objects which may snag telephone cord 202 and cause detachment of telephone cord retainer 106 from telephone casing 104.

In some embodiments, a magnetic telephone cord trench may be used to seat the telephone cord 202. Telephone cord 202 can comprise magnetic material such as ferrous metal. The magnetic telephone cord trench may be close in size to the telephone cord 202 such that telephone cord 202 rests inside the telephone cord trench by magnetic force. Magnetic force may be created from one or more magnets 102 positioned inside telephone casing 104 and/or by a telephone cord trench comprising one or more magnets. Furthermore, in some embodiment, the magnetic telephone cord trench will not utilize tabs to hold the telephone cord 202 to the telephone casing 104. In some embodiments, the magnetic telephone cord trench will not utilize telephone cord retainer 106 to hold the telephone cord 202 to the telephone casing 104.

In some embodiments, handset 206 may comprise magnetic material such as, for example, ferrous metal. The magnetic material of handset 206 can be placed near the bottom of handset 206 such that the bottom of handset 206 can be automatically guided into its seating position on the front side of telephone system 100. In some embodiments, both telephone cord retainer 106 and handset 206 can contain magnetic material such that magnet 102 may provide magnetic force to retain both telephone cord retainer 106 and handset 206 to telephone casing 104. Use of magnetic force to automatically guide and hold handset 206 in its seating position may be useful in reducing handset lift, whereby a telephone handset is not seated properly (i.e., lifted) on its cradle. This can be caused by tangled telephone cords or by improper placement of the handset on its cradle. This can happen frequently when, for example, a telephone user is hurried and slams a handset on the cradle causing misalignment with the handset cradle. Embodiments of the present technology may improve both telephone cord management and handset management through the utilization of at least one magnet and a magnetic telephone cord retainer 106 along with magnetic materials associated with the handset 206.

In some embodiments, telephone cord retainer 106 may be permanently affixed to one position of the telephone cord 202. In some embodiments, telephone cord retainer 106 can be detached from telephone cord 202 and attached at different locations of telephone cord 202. This may be done, for example, by utilizing telephone cord retainer opening 108 to route/slide telephone cord retainer 106 onto various parts of telephone cord 202. In some embodiments, opening 108 can be configured to allow a user to open and close opening 108 in order to remove telephone cord retainer 106 from telephone cord 202 and move telephone cord retainer 106 to a different portion of telephone cord 202. This may be done utilizing a lock/unlock feature of the opening 108 to open and secure opening 108 by allowing opening 108 to lock and unlock into telephone cord retainer 106.

FIG. 3 illustrates example telephone system 100 showing embodiments of the present technology. In some embodiments, one or more divots 302 may be formed in telephone casing 104. Divot 302 can include opening 304, which may provide seating for telephone cord retainer tab 110. Protruding piece 306 may increase retention of telephone cord retainer 106. Protruding piece 306 can be attached to telephone casing 104 and located above opening 304 so that, for instance, when telephone cord retainer 106 is seated in divot 302, protruding piece 306 may cover at least a portion of a top edge of telephone cord retainer 106 to prevent inadvertent disconnection of telephone cord retainer 106 from telephone casing 104, which could result if telephone cord 202 is inadvertently pulled from backside 204 of telephone casing 104.

In some embodiments, multiple divots 302 can be formed to allow a user to choose different routes for telephone cord management. For example, a user may want to route telephone cord 202 from backside 204 to the side of telephone casing 104. A different user may wish to route telephone cord 202 from backside 204 to the bottom or top of telephone casing 104. In some embodiments, a single divot 302 may provide multiple positioning options for telephone cord retainer 106. For example, a single divot 302 can provide for the telephone cord retainer 106 to be positioned such that the telephone cord 202 may be routed to the side of telephone casing 104 or to the top or bottom of telephone casing 104. In some embodiments, the different positioning of telephone cord retainer 106 along with telephone cord 202 may reduce handset lift by providing a user with options to route the telephone cord 202 in such a way that telephone cord 202 does not fold over itself. For example, if a user typically experiences handset lift (i.e., handset not resting properly on handset cradle) when routing telephone cord 202 from the bottom of telephone system 100 to telephone cord jack receptacle 208, embodiments of the present technology may allow the user to utilize a different routing path (e.g., from the side of telephone system 100 instead of the bottom) for telephone cord 202, which can reduce handset lift by reducing the likelihood that telephone cord 202 will fold over itself at the bottom of telephone casing 104. This folding over of telephone cord 202 at the bottom of telephone casing 104 can cause handset 206 to seat improperly in its cradle on the front side of telephone casing 104.

In some embodiments, telephone cord retainer 106 can be positioned on a front side or edge of the telephone system 100. One or more telephone cord retainer openings 304 may provide for improved seating of the telephone cord retainer 106 to the divot 302 and therefore provide for improved retention of telephone cord retainer 106 to telephone casing 104. In some embodiments, magnet 102 may provide magnetic force to telephone cord retainer 106, handset 206, or both.

Figure 4:
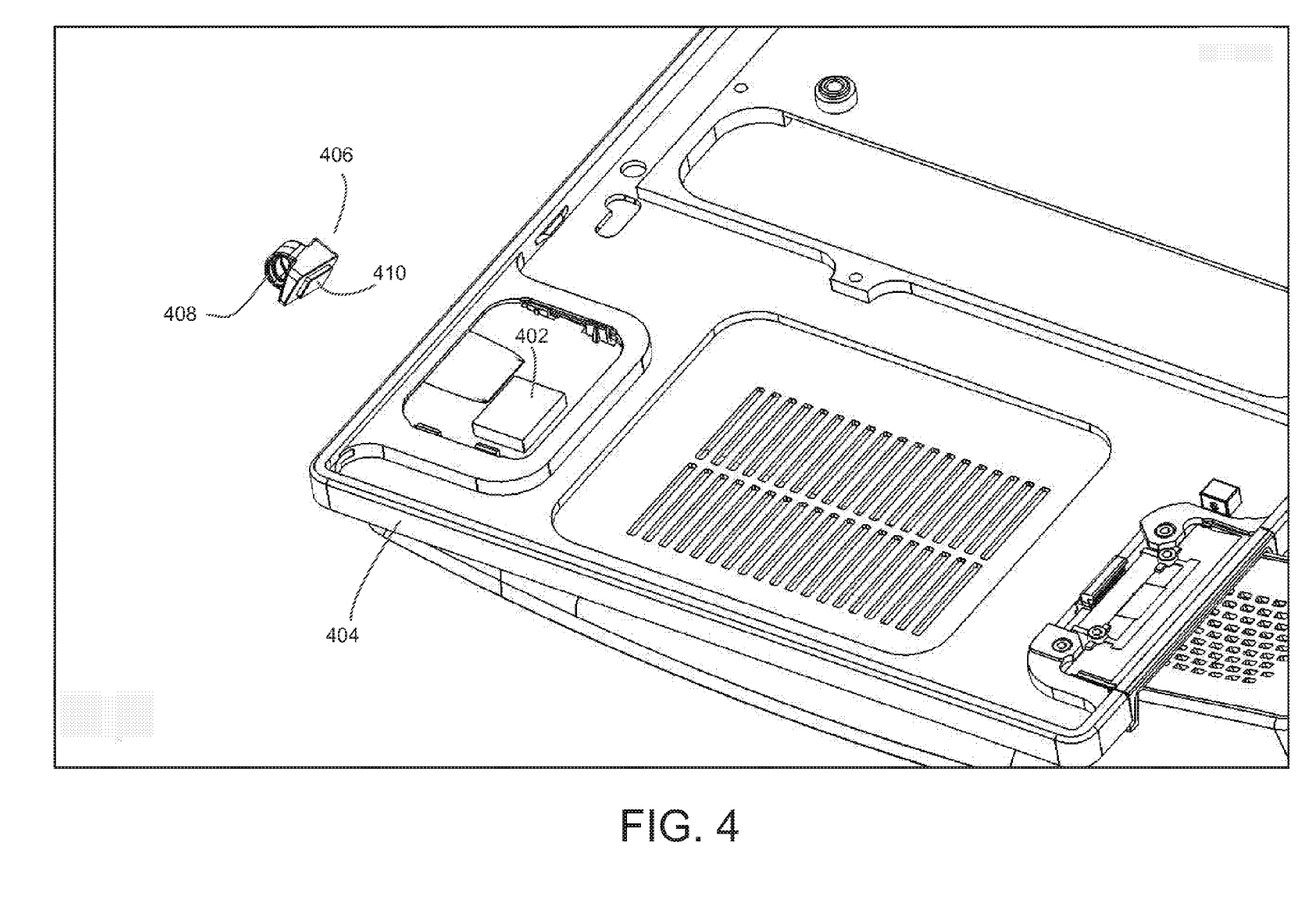
FIG. 4 illustrates an example telephone system showing embodiments of the present technology.

FIG. 4 is a perspective view of an example telephone system 400 which illustrates various embodiments of the present disclosure. A telephone casing 404 forms the body of the telephone system 400, wherein the telephone casing 404 may have a substantially hollow interior portion formed to hold constituent mechanical and electrical components of the telephone system. This hollow portion may be formed from opposing panels, wherein one or more of the panels may be a concave shell. An upper portion and a lower portion may be sealed together in order to define the hollow interior portion. In some embodiments, one or more of the opposing concave shells may be constructed from a single piece of metal. As illustrated in FIG. 4, only the upper portion of telephone casing 404 is seen, with the lower portion or backside being omitted for purposes of clarity.

A magnet 402 may be placed inside telephone casing 404 or at any other appropriate location such that magnet 402 may provide a magnetic force to components of the telephone system 400, such as, for example, telephone cord retainer 406. Magnet 402 may be composed of permanent magnetic materials, such as iron or alloys of rare earth metals, although it is appreciated that magnet 402 may be composed of other materials suitable for providing or otherwise generating a magnetic force or interaction with components of the telephone system 400.

Telephone cord retainer 406 may define an opening 408, which may be a hole, circular opening, U-shaped opening, channel, or the like. The opening 408 can be used to retain a telephone cord to the telephone cord retainer 406. Telephone cord retainer 406 may comprise a magnetic material or ferrous metal such that telephone cord retainer 406 may be reversibly affixed to telephone system 400 via a magnetic force or interaction between magnet 402 and telephone cord retainer 406.

An attachment piece 410 may be utilized to enhance the retention of the telephone cord retainer 406 to telephone casing 404. Attachment piece 410 can be seated into a recessed portion of a backside 506 (pictured in FIG. 5) and furthermore may make direct contact with magnet 402 in order to increase the magnetic force and thereby the strength of the attachment.

Figure 5:
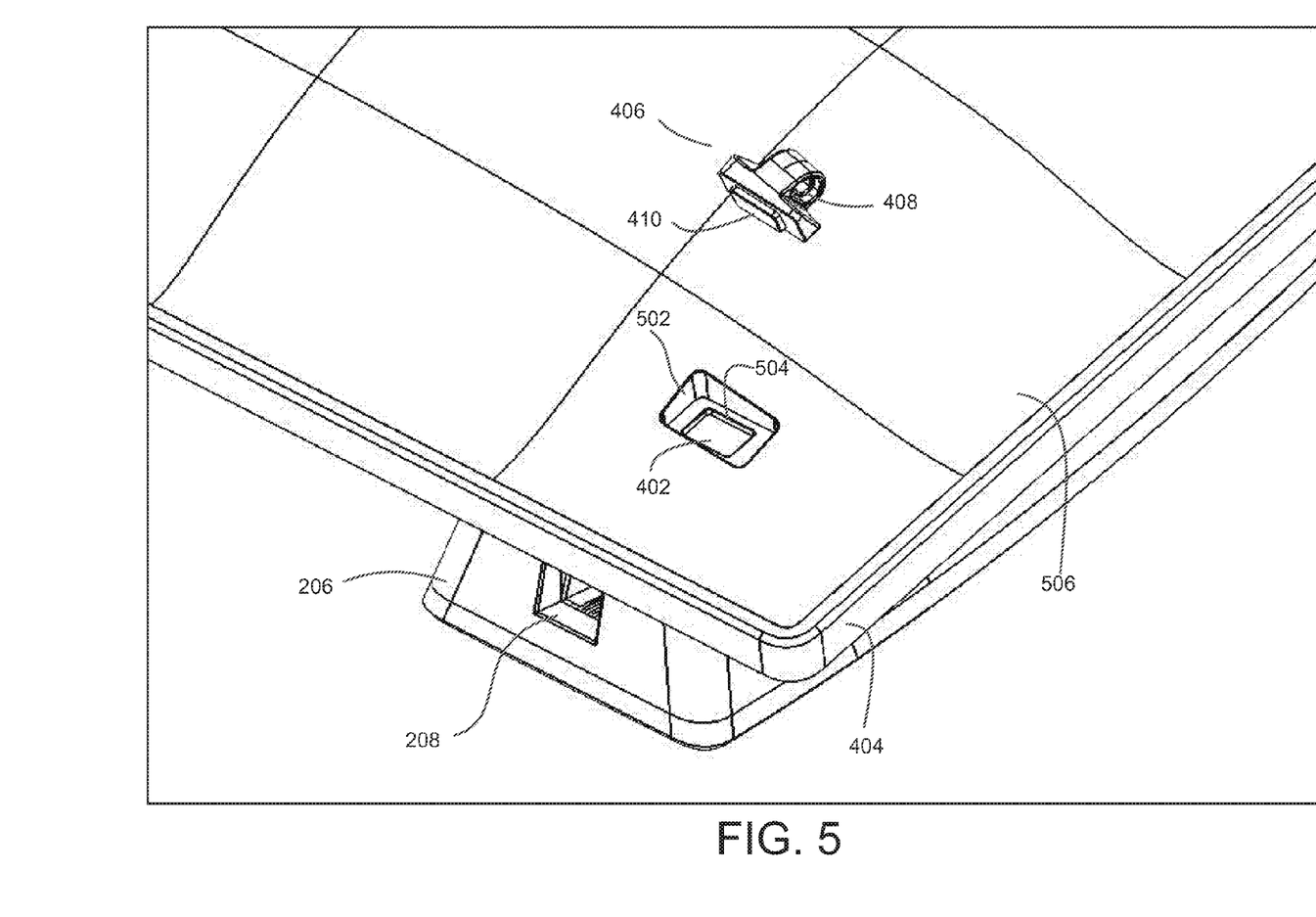
FIG. 5 illustrates an example telephone system showing embodiments of the present technology.

FIG. 5 is a perspective view of the bottom of the example telephone system 400, with the lower portion or backside 506 depicted. Backside 506 forms a seam with telephone casing 404 such that the hollow interior portion of telephone system 400 is substantially sealed, wherein in various embodiments this seal may be permanent or reversible. The backside 506 defines an exterior surface of the telephone system 400, and is accordingly provided with a recessed portion 502 to receive and secure the telephone cord retainer 406. Furthermore, within recessed portion 502 is a seating divot 504 to receive and secure the attachment piece 410.

Recessed portion 502 is provided as an opening or other discontinuity in the surface of backside 506 such that magnet 402, contained within the interior of the telephone system 400, may be exposed and make direct contact with attachment piece 410. In various embodiments, magnet 402 may be covered by the surface of backside 506 such that magnet 402 does not make direct contact with attachment piece 410. When telephone cord retainer 406 is placed into recessed portion 502, friction forces between the interior sidewalls of recessed portion 502 and the sidewalls of the telephone cord retainer 406 may act to further prevent accidental slippage or other inadvertent removal of cord retainer 406 from the recessed portion 502, and it is appreciated that the material of one or more of telephone cord retainer 406 and recessed portion 502 may be selected or otherwise treated to modulate this frictional force accordingly.

The attachment piece 410 enhances the seating of the telephone cord retainer 406 in the recessed portion 502 via its magnetic interaction with the magnet 402, and provides further enhancement via the additional frictional forces that arise between the sidewalls of attachment piece 410 and the sidewalls of the seating divot 504. As such, the cord retainer 406 may be reversibly attached to the telephone system 400 due to frictional and magnetic forces, and without the use of tabs, clips, or other mechanical attachment devices that would be appreciated by one of ordinary skill in the art.

Figure 6:
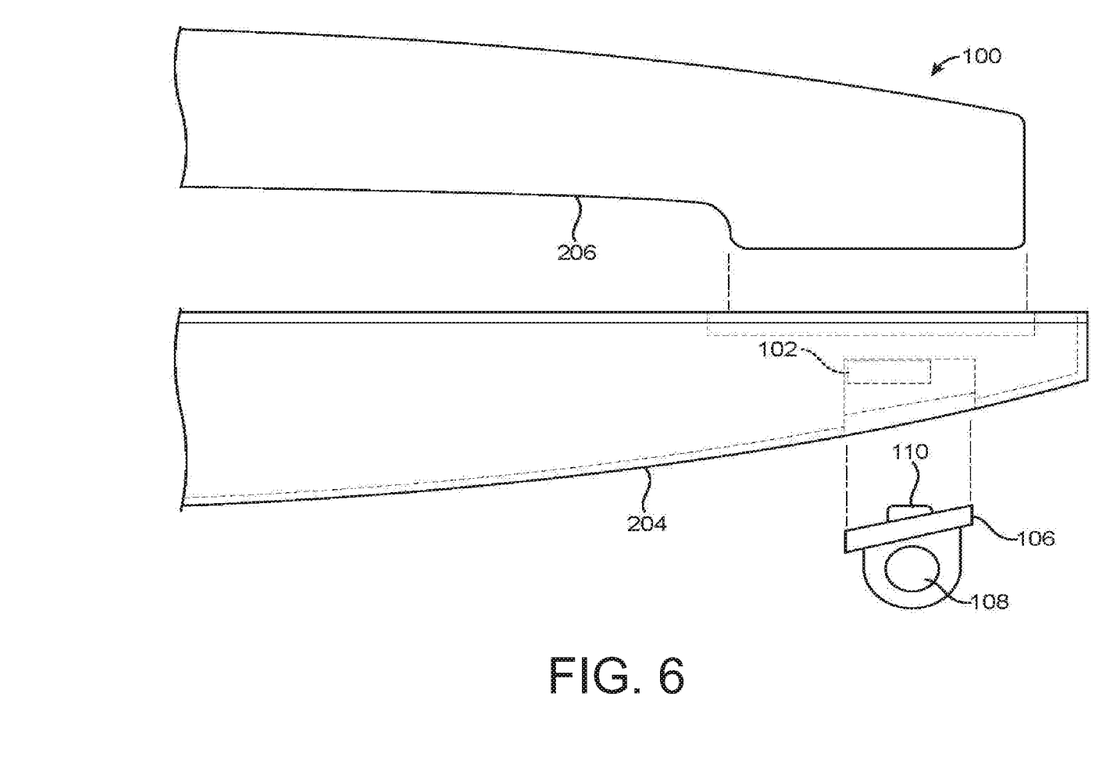
FIG. 6 illustrates an example telephone system showing embodiments of the present technology

FIG. 6 is a simplified side view of the example telephone system 100, and depicts a relative positioning between magnet 102, telephone handset 206, and telephone cord retainer 106 that may be found in some embodiments. If magnet 102 is substantially disposed in the middle of the hollow interior space of telephone system 100, then it may provide magnetic interaction with both the telephone handset 206 and the telephone cord retainer 106. If telephone handset 206 is composed of a magnetic or otherwise ferrous material, or has some portion which is composed of a magnetic or other ferrous material, then the magnetic force can help to improved handset retention in the cradle and prevent handset lift, as described previously. Furthermore, it would be appreciated by one of ordinary skill in the art that a magnet, similar or identical to magnet 102, may be provided at an opposite end of the telephone system 100, such that this magnet would provide a magnetic force between the upper, earpiece portion of the telephone handset 206 and its respective cradle. In various embodiments, magnetic retention forces provided at both ends of the telephone handset 206 may serve to further increase handset retention in the cradle and reduce handset lift.

Figure 7:
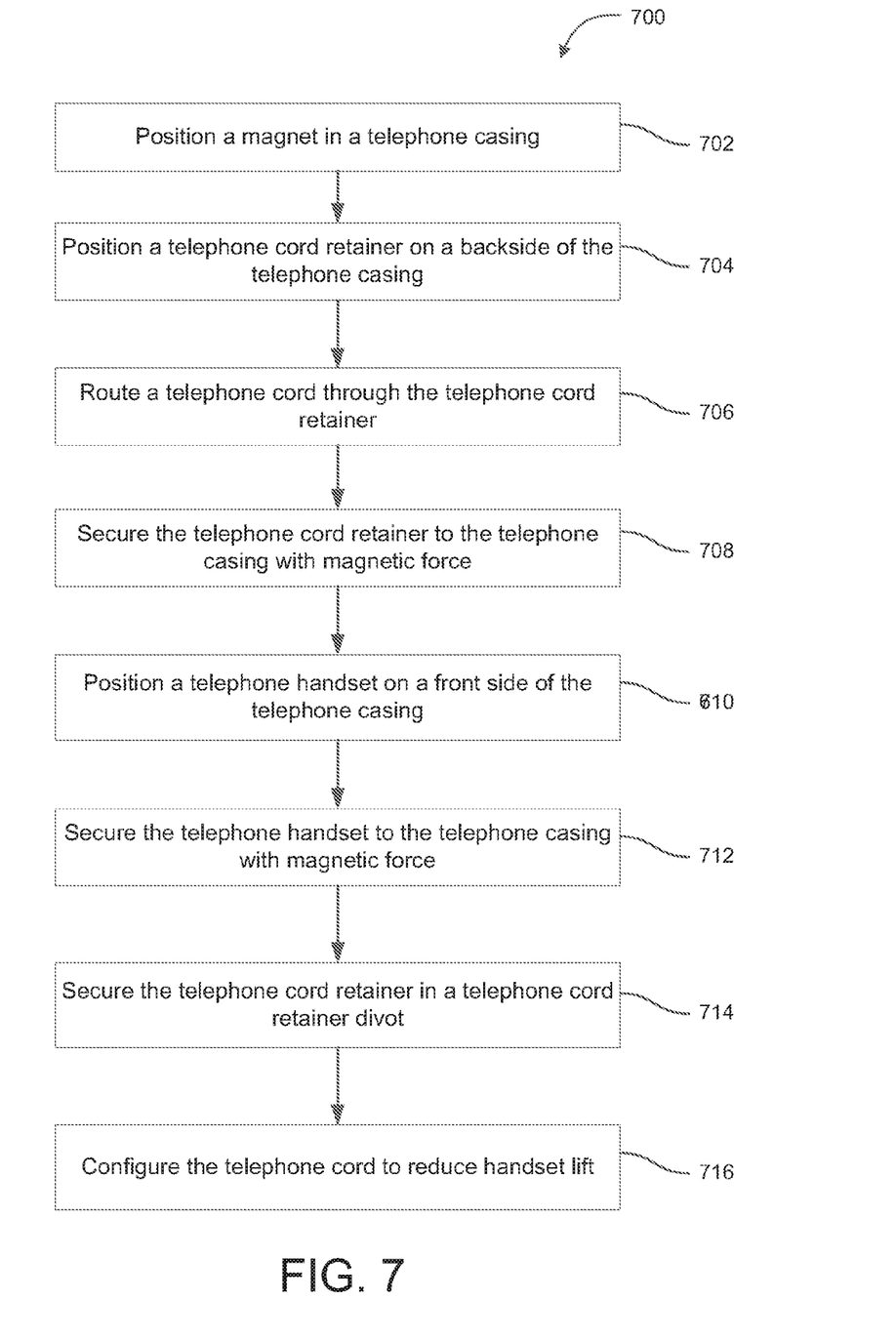
FIG. 7 illustrates an example procedure utilized by embodiments of the present technology.

FIG. 7 illustrates an example procedure 700 utilized by embodiments of the present technology. Procedure 700 can begin at 702, wherein a magnet may be positioned in a telephone casing. Procedure 700 may continue at 704, wherein a telephone cord retainer can be positioned on a backside of the telephone casing. At 706, a telephone cord may be routed through the telephone cord retainer. Process 700 may continue at 708, wherein the telephone cord retainer can be secured to the telephone casing with magnetic force. At 710, a telephone handset may be positioned on a front side of the telephone casing. Process 700 can continue at 712, wherein the telephone handset may be secured to the telephone casing with magnetic force. At 714, the telephone cord retainer can be secured in a telephone cord retainer divot. Procedure 700 may continue at 716, wherein the telephone cord is configured to reduce handset lift.

Although a variety of examples and other information were used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed with components other than those identified herein. The described features and steps are disclosed as examples of components of systems and methods within the scope of the appended claims. Moreover, claim language reciting "at least one of" a set indicates that one member of the set or multiple members of the set satisfy the claim.

Further, features described with reference to an embodiment disclosed herein can be combined with, or implemented in, any other embodiments disclosed herein.

While there have been shown and described illustrative embodiments of the present technology, it is to be understood that various other adaptations and modifications may be made within the spirit and scope of the embodiments herein. For example, the embodiments have been shown and described herein with relation to a particular telephone system. However, the embodiments in their broader sense are not as limited, and may, in fact, be used with any number of telephone systems.

Accordingly, this description is to be taken only by way of example and not to otherwise limit the scope of the embodiments herein. Therefore, it is the object of the appended claims to cover all such variations and modifications as come within the true spirit and scope of the technology herein.

What is claimed is:

1. A telephone, comprising:
   a telephone casing including a top panel and a bottom panel, the bottom panel having an interior portion and an exterior portion;
   a magnet mounted to the interior portion of the bottom panel;
   a telephone cord; and
   a telephone cord retainer comprising magnetic material, wherein the telephone cord retainer, including a cord retention portion, is configured to retain the telephone cord, the telephone cord retainer magnetically mounted to the exterior portion of the bottom panel, opposite the magnet mounted to the interior portion of the bottom panel.

2. The telephone of claim 1, wherein the top panel defines a depression, the telephone comprising:
   a handset comprising magnetic material, the handset configured to be received in the depression of an exterior portion of the top panel, the magnet mounted to the interior portion of the bottom panel and adjacent to an interior portion of the top panel opposite the depression; thereby the handset is magnetically seated within the depression.

3. The telephone of claim 1, wherein the telephone cord retainer is fixed to the telephone cord.

4. The telephone of claim 1, wherein the telephone cord is removable from the telephone cord retainer.

5. The telephone of claim 1, wherein the exterior portion of the bottom panel of the telephone casing defines a telephone cord retainer divot for receiving the telephone cord retainer.

6. The telephone of claim 5, wherein the telephone cord retainer further includes a protrusion, and the exterior portion of the bottom panel of the telephone casing further defines an opening, the opening receiving the protrusion in a mating relationship, thereby mechanically securing the telephone cord retainer to the exterior portion of the bottom panel.

7. The telephone of claim 1, wherein the telephone cord retainer routes the telephone cord away from the bottom of the telephone casing.

8. The telephone of claim 1, wherein the telephone cord retainer is configured to route the telephone cord to a side of the telephone.

9. The telephone of claim 1, wherein the telephone cord retainer is detachable from the telephone casing.

10. The telephone of claim 1, wherein the bottom panel of the telephone casing defines a telephone cord trench that retains the telephone cord to the telephone casing with magnetic force.

11. The telephone of claim 10, wherein the telephone cord comprises magnetic material, the telephone cord configured to be received in the telephone cord trench.

12. A method, comprising:
    mounting a magnet to an interior portion of a telephone casing;
    magnetically mounting a telephone cord retainer on an exterior portion of a bottom panel of the telephone casing, wherein the telephone cord retainer comprises magnetic material and is mounted opposite the magnet mounted to the interior portion of the telephone casing; and
    retaining a telephone cord with the telephone cord retainer.

13. The method of claim 12, comprising:
    positioning a telephone handset on a top panel of the telephone casing, wherein the top panel defines a depression and the telephone handset comprises magnetic material; and
    magnetically seating the telephone handset within the depression.

14. The method of claim 13, comprising:
    magnetically retaining the telephone cord retainer and the telephone handset to the telephone casing.

15. The method of claim 12, comprising:
    magnetically mounting the telephone cord retainer in a telephone cord retainer divot.

16. The method of claim 12, comprising:
    configuring the telephone cord retainer to route a telephone cord to a side of the telephone.

* * * * *